(12) United States Patent
Karazhov et al.

(10) Patent No.: US 9,846,501 B2
(45) Date of Patent: Dec. 19, 2017

(54) METHOD FOR SIMULATING DIGITAL WATERCOLOR IMAGE AND ELECTRONIC DEVICE USING THE SAME

(71) Applicant: Samsung Electronics Co., Ltd., Suwon-si, Gyeonggi-do (KR)

(72) Inventors: Andrey Karazhov, Kherson (UA); Andrii Grygoriev, Khartsyzsk (UA); Mykhailo Tkach, Khmelnytskyi (UA); Ievgenii Iakishyn, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 14/925,106

(22) Filed: Oct. 28, 2015

(65) Prior Publication Data

US 2016/0124558 A1 May 5, 2016

(30) Foreign Application Priority Data

Oct. 29, 2014 (KR) ........................ 10-2014-0148149

(51) Int. Cl.
| | |
|---|---|
| *G06F 3/041* | (2006.01) |
| *G06F 3/0481* | (2013.01) |
| *G06F 3/0484* | (2013.01) |
| *G06F 3/0488* | (2013.01) |
| *G06T 11/00* | (2006.01) |
| *G06T 11/40* | (2006.01) |

(Continued)

(52) U.S. Cl.
CPC ........ *G06F 3/0412* (2013.01); *G06F 3/04812* (2013.01); *G06F 3/04845* (2013.01); *G06F 3/04883* (2013.01); *G06T 11/001* (2013.01); *G06T 11/20* (2013.01); *G06T 11/40* (2013.01); *G06T 13/80* (2013.01); *G06T 2210/24* (2013.01)

(58) Field of Classification Search
CPC .............. G06F 3/0412; G06F 3/04812; G06F 3/04845; G06F 3/04883; G06T 11/001; G06T 11/20; G06T 11/40; G06T 13/80; G06T 2210/24
See application file for complete search history.

(56) References Cited

U.S. PATENT DOCUMENTS

| | | | | |
|---|---|---|---|---|
| 2013/0127898 | A1* | 5/2013 | DiVerdi | ............... G06T 11/203 345/600 |
| 2013/0263027 | A1* | 10/2013 | Petschnigg | ............. G06T 11/00 715/761 |

OTHER PUBLICATIONS

Ardill; 2. Overview of Watercolor Painting Techniques in Photoshop. Video 2; XP054976266; URL: https://www.youtube.com/watch?v=gvcpUxg6yJI; Oct. 1, 2012.

(Continued)

*Primary Examiner* — Insa Sadio
(74) *Attorney, Agent, or Firm* — Jefferson IP Law, LLP

(57) ABSTRACT

An electronic device is provided. The electronic device includes an input device configured to receive a touch gesture that includes a drawing action, a display configured to output a drawing to an area corresponding to the touch gesture, and a processor configured to identify a number of drawing actions that are input into each unit portion in the area based on the drawing action, and a number of touches input into each unit portion in the area, and determine display attributes of the drawing in each unit portion based on the number of drawing actions and the number of touches, wherein the drawing action includes a touch from a time when a touch input occurs to a time when the touch input ends.

15 Claims, 10 Drawing Sheets

(51) Int. Cl.
*G06T 13/80* (2011.01)
*G06T 11/20* (2006.01)

(56) References Cited

OTHER PUBLICATIONS

Kim; Photoshop CS6 Tutorial—Brush Opacity vs Flow; XP054976263; URL: https://www.youtube.com/watch?v=JISU6sQQHA; Mar. 4, 2013.
Rose; Paper by 53: Watercolor Brush Comparison; XP054976264; URL: https://www.youtube.com/watch?v=Lt1olsH4wHo; Sep. 28, 2014.
Wacom; Five Photoshop Tips for Wacom Tablet Beginners; XP054976265,URL: https://www.youtube.com/watch?v=QTBjcuyhmq0; Oct. 6, 2014.

\* cited by examiner

FIG. 2
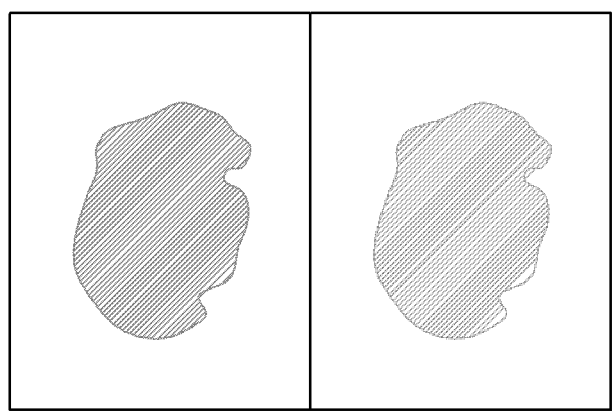
<201> : "wet on wet" DRAWING TECHNIQUE
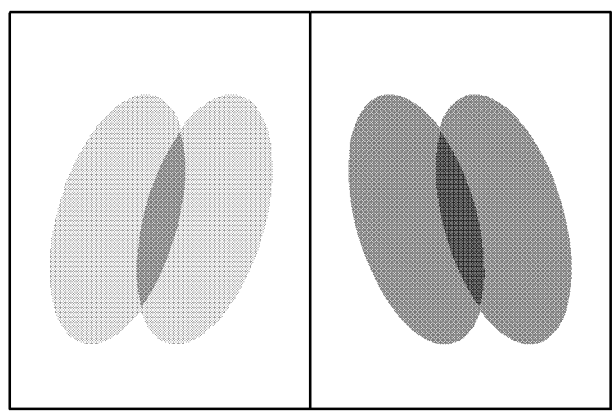
<202> : "wet on dry" DRAWING TECHNIQUE

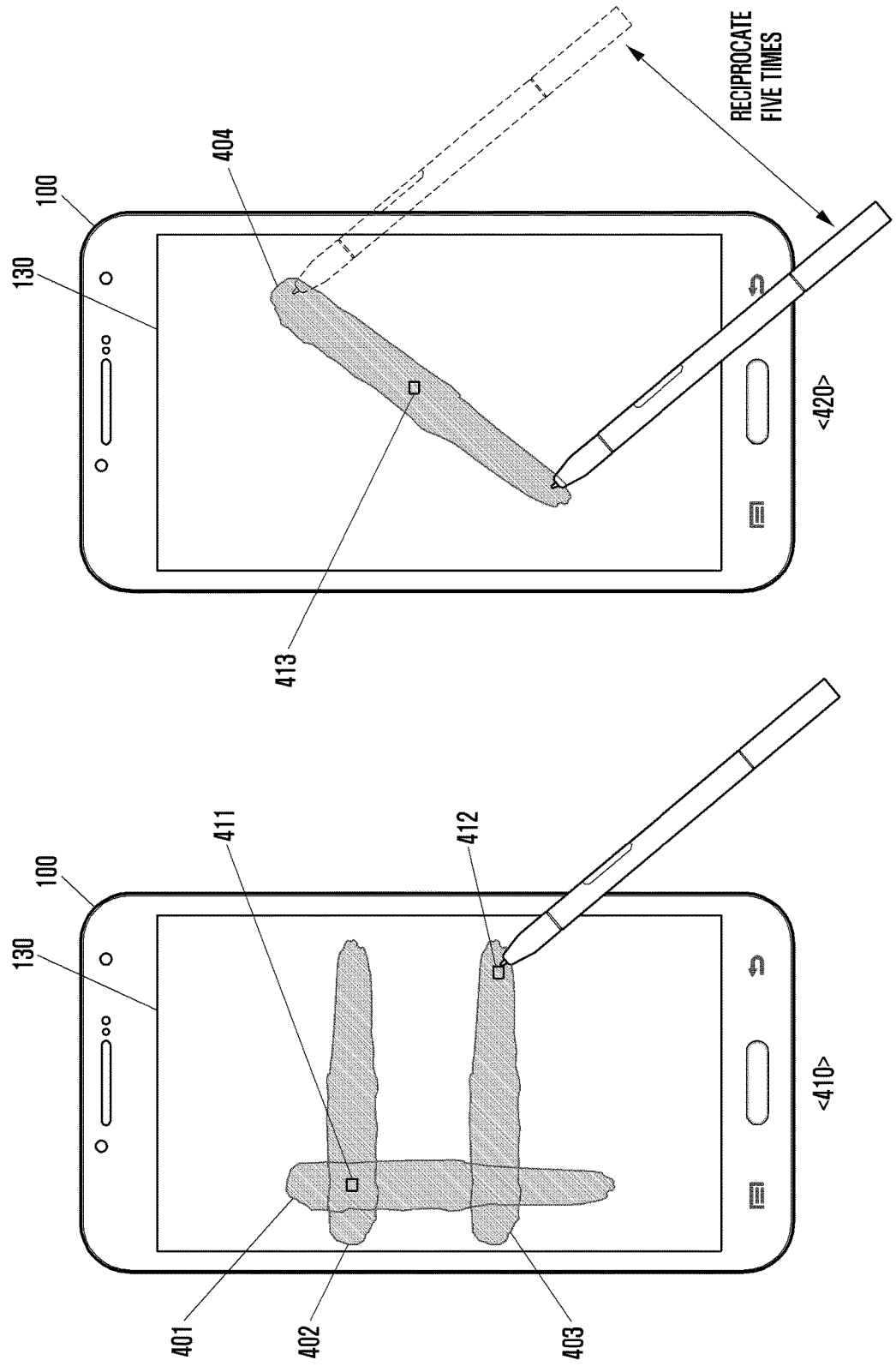

FIG. 8
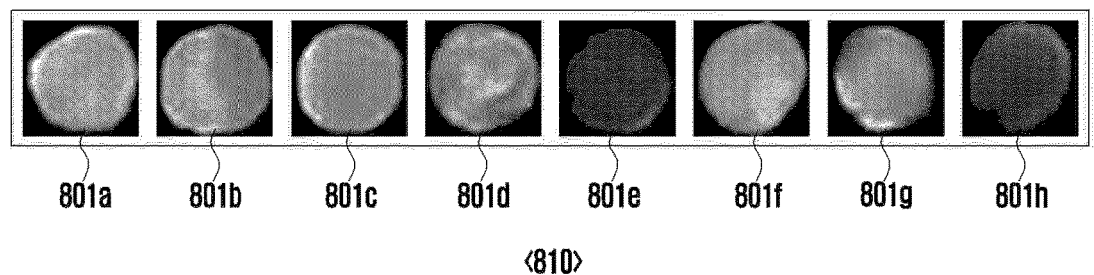
⟨810⟩
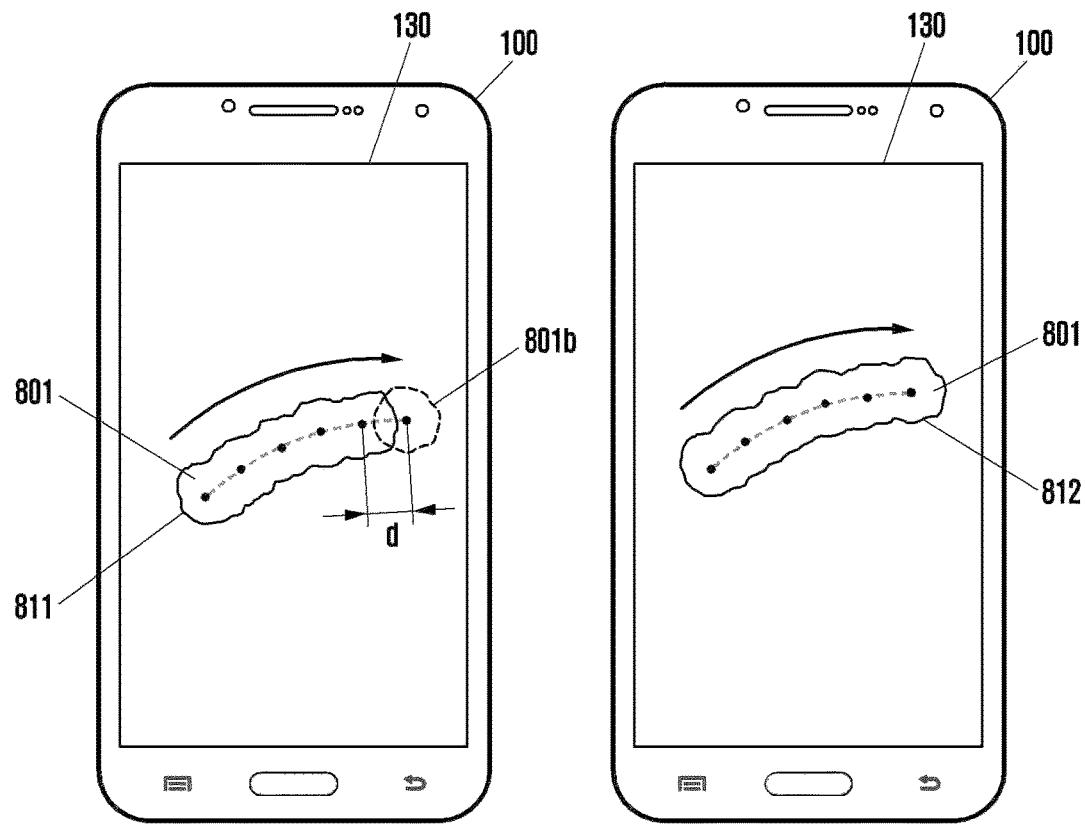
⟨820⟩

METHOD FOR SIMULATING DIGITAL WATERCOLOR IMAGE AND ELECTRONIC DEVICE USING THE SAME

CROSS-REFERENCE TO RELATED APPLICATION(S)

This application claims the benefit under 35 U.S.C. §119(a) of a Korean patent application filed on Oct. 29, 2014 in the Korean Intellectual Property Office and assigned Serial number No. 10-2014-0148149, the entire disclosure of which is hereby incorporated by reference.

TECHNICAL FIELD

The present disclosure relates to an electronic device that simulates digital watercolor images and a method for simulating digital watercolor images.

BACKGROUND

Computer graphic technology has been significantly developed in the creation of non-realistic images, such as cartoons or artistic images, as well as existing photorealistic images. The rapid expansion of a digital content market, such as movies, animations, television (TV), games, or the like, has given prominence to the non-realistic images mentioned above. In particular, recently, various attempts to implement traditional drawing techniques, such as watercolor, or oil painting, using a computer-based virtual canvas have been made.

Meanwhile, typical watercolor rendering researches may be broadly classified into two categories. The first is a method in which a physical model that demonstrates the interaction of paints, water, and paper and the movement of watercolors is calculated through a simulation. The second is to obtain the watercolor image effect by applying an image processing technique without the use of a physical model.

The physical model, in general, may express the movement of watercolors and water by introducing fluid simulation equations, such as, for example, the Navier-Stokes Equation, the Lattice Boltzmann Equation, or the like. The methods that do not use the physical model may introduce a variety of image processing techniques to synthesize the results in the watercolor style. For example, a texture may be made in advance rather than expressing the movement of watercolors through a complicated simulation, and when creating the image, the texture is synthesized with a brush stroke to create a final image, or the edge detection technique may be used to simulate the phenomenon in which the watercolors agglomerate at the edge of the area that is painted in watercolors.

The above information is presented as background information only to assist with an understanding of the present disclosure. No determination has been made, and no assertion is made, as to whether any of the above might be applicable as prior art with regard to the present disclosure.

SUMMARY

Since the method of simulating the watercolor image that uses a physical model introduces a fluid simulation equation to express the movement of paints and water, significant time is consumed to accurately solve the fluid simulation equation.

In addition, in order to use the drawing techniques, such as, for example, the wet-on-wet drawing technique, or the wet-on-dry drawing technique, to simulate the watercolor image in the electronic device, the user must frequently select and change the desired drawing technique.

Aspects of the present disclosure are to address at least the above-mentioned problems and/or disadvantages and to provide at least the advantages described below. Accordingly, an aspect of the present disclosure is to provide a method for simulating digital watercolor images and an electronic device using the same, and the present disclosure provides an electronic device that reproduces the watercolor images without using a physical modeling method. In addition, the present disclosure provides an electronic device that selects a drawing technique based on the number of drawing actions and the number of touches, which are received from the user, and simulates the digital watercolor image according to the selected drawing technique.

In accordance with an aspect of the present disclosure, an electronic device is provided. The electronic device includes an input device configured to receive a touch gesture that includes a drawing action, a display configured to output a drawing to an area corresponding to the touch gesture, and a processor configured to identify a number of drawing actions that are input into each unit portion in the area and a number of touches input into each unit portion in the area based on the drawing action, and determine display attributes of the drawing in each unit portion based on the number of drawing actions and the number of touches, wherein the drawing action includes a touch from a time when a touch input occurs to a time when the touch input ends.

In accordance with another aspect of the present disclosure, a method for simulating a digital watercolor image in an electronic device is provided. The method includes receiving a touch gesture that includes a drawing action through an input device, and outputting a drawing in the area corresponding to the touch gesture, wherein the outputting of the drawing output comprises identifying the number of drawing actions that are input into each unit portion in the area based on the drawing action, identifying the number of touches that are input into each unit portion, and determining display attributes of the drawing in each unit portion based on the basis of the number of drawing actions and the number of touches, and wherein the drawing action includes moving a touch from the time when a touch input occurs to the time when the touch input ends.

The method for simulating digital watercolor images, according to various embodiments of the present disclosure, allows the user to intuitively use the wet-on-wet drawing technique and the wet-on-dry drawing technique without additional inputs so that the digital watercolor images can be easily reproduced.

The method for simulating digital watercolor images, according to various embodiments of the present disclosure, creates a brush touch line by composing pre-stored images rather than using a physical modeling method in which significant time is consumed to create the brush touch line, so that the brush touch line can be rapidly created and displayed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates drawing techniques of a watercolor image, which are to be simulated by an electronic device, according to various embodiments of the present disclosure;

FIG. 4 illustrates identification of a number of drawing actions and a number of touches according to various embodiments of the present disclosure;

FIG. 8 illustrates creating an edge of a drawing using at least one brush stroke image according to various embodiments of the present disclosure.

Throughout the drawings, it should be noted that like reference numbers are used to depict the same or similar elements, features, and structures.

DETAILED DESCRIPTION

Figure 1:
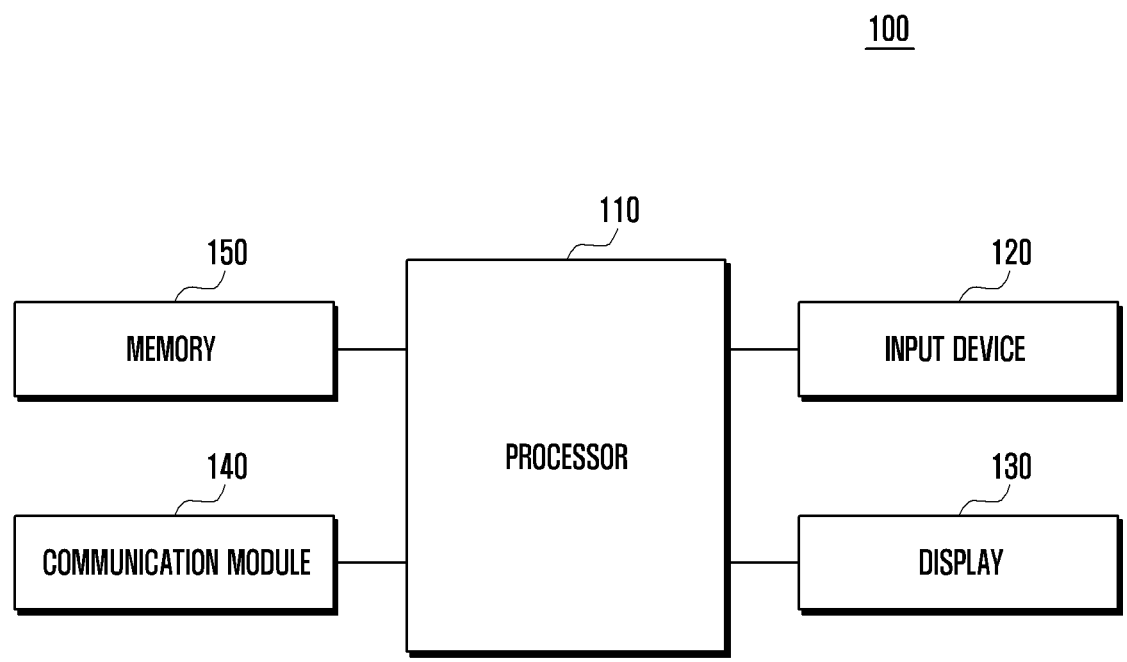
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

The term "or" means "and/or". As used herein, the term "and/or" includes any and all combinations of one or more of the associated listed items. It will be further understood that the terms "comprises" and/or "comprising", or "includes" and/or "including" when used herein, specify the presence of stated features, regions, integers, operations, elements, and/or components, but do not preclude the presence or addition of one or more other features, regions, integers, operations, elements, components, and/or groups thereof.

It will be understood that, although the terms "first", "second", "third", etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section could also be referred to as a second element, component, region, layer or section, and vice versa, without departing from the teachings herein.

Herein, an electronic device may include a communication function. For example, an electronic device may be embodied as a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to an embodiment of the present disclosure, an electronic device may be a smart home appliance that includes a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to an embodiment of the present disclosure, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), an flight data recorder (FDR), a car infotainment device, electronic equipment for ship (e.g., a marine navigation system, a gyrocompass, etc.), avionics, security equipment, or an industrial or home robot.

According to an embodiment of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device may be any one of the above-mentioned devices or any combination thereof. As well understood by those skilled in the art, the above-mentioned electronic devices are provided as examples only and are not to be considered a limitation of this disclosure.

A sound output device according to the present disclosure can include a communication function. For example, a sound output device can be a combination of one or more of various devices such as a wired earphone, a wireless earphone, a wired headset, or a wireless headset.

FIG. 1 is a block diagram of an electronic device according to various embodiments of the present disclosure.

Referring to FIG. 1, the electronic device 100 may include a processor 110, an input device 120, a display 130, a communication module 140, and a memory 150.

The processor 110 may receive instructions from other elements (e.g., the input device 120, the display 130, the communication module 140, the memory 150, or the like), and may decode the received instructions to thereby perform the calculation and data processing according to the decoded instructions. The processor 110 may drive an operating system or application programs to control a plurality of hardware or software elements connected with the processor 110, and may perform the processing of data including multimedia data. The processor 110 may be implemented as a system on chip (SoC). The processor 110 may further include a graphics processing unit (GPU), (not shown).

The processor 110, according to various embodiments of the present disclosure, may output a drawing to the area corresponding to a touch gesture received through the input device 120. The drawing may be an image of a brush touch line corresponding to a touch gesture received through a touch panel. In providing the drawing to the area corresponding to the touch gesture, the processor 110 may identify the number of touches or the number of drawing actions of each unit portion in the touch gesture area. The number of touches refers to the number of times that touch occurs in each unit portion. The number of drawing actions refers to the number of times that the touch gesture occurs, and one drawing action means the operation in which the touch: occurs; moves; and ends. For example, if the user performs a touch gesture in the shape of a circle three times while maintaining the touch on the touch panel, the number of drawing actions is one and the number of touches in each unit portion is three. Alternatively, if the user repeats the operations of: starting a touch; making a touch gesture in the shape of a circle; and ending the touch in the same area three times, the number of drawing actions identified in the area is three, and the number of touches in each unit portion is three.

The processor 110, according to various embodiments of the present disclosure, may determine the display attributes of the drawing displayed in each unit portion on the basis of the number of touches and the number of drawing actions when the processor 110 provides the drawing to the area corresponding to the touch gesture through the display 130. For example, when receiving one drawing action through the input device 120, the processor 110 may determine the display attributes of the drawing such that the chromaticity of the drawing displayed in the unit portion increases depending on the increase in the number of touches according to the one drawing action that is input into the unit portion in the area corresponding to the touch gesture. If the number of touches reaches the predetermined number of touches, the processor 110 may determine the display attributes of the drawing such that the chromaticity of the drawing displayed in the unit portion decreases depending on the increase in the number of touches. For another example, when two or more drawing actions are received through the input device 120, the processor 110 may determine the display attributes of the drawing such that the chromaticity of the drawing increases depending on the increase in the number of touches. If the number of touches reaches the predetermined number of touches, the processor 110 may determine the display attributes of the drawing such that the chromaticity of the drawing displayed in the unit portion remains constant.

According to various embodiments of the present disclosure, when the processor 110 provides the drawing to the area corresponding to a touch gesture through the display 130, the processor 110 may create the edge of the drawing corresponding to the touch gesture by using one or more brush stroke images. The brush stroke image may be a dot-shaped image when the brush touches the paper first to draw the brush touch line. The edge of the drawing corresponding to the touch gesture may be the shape of the brush touch line that is drawn to correspond to the touch gesture. The processor 110 may create the edge of the drawing by disposing one or more brush stroke images at a predetermined interval along the path of the touch gesture. The processor 110 may display the created edge of the drawing.

The input device 120 may include a touch panel, a pen sensor, a key, or an ultrasonic input device. For example, the touch panel may recognize a touch input through at least one of a capacitive type, a resistive type, an infrared type, and an acoustic wave type. The touch panel may further include a control circuit. The capacitive type touch panel may recognize physical contact or proximity input. The touch panel may further include a tactile layer to provide a user with a tactile reaction.

The pen sensor may be implemented by using the same or similar method to receiving a user's touch input or by using a separate recognition sheet. For example, the key may include a physical button, an optical key, or a keypad. The ultrasonic input unit may identify data by detecting an acoustic wave with a microphone of the electronic device through an input unit for generating an ultrasonic signal, and may perform wireless recognition. According to an embodiment of the present disclosure, the electronic device 100 may receive a user input from an external device (for example, a computer or server) via the communication module 140.

The input device 120 may receive a touch gesture including one or more drawing actions.

The display 130 may include a panel, a hologram device, or a projector. For example, the panel may be a liquid crystal display (LCD), an active matrix organic light emitting diode (AM-OLED), or the like. For example, the panel may be implemented to be flexible, transparent, or wearable. The panel may be formed to be a single module with the touch panel. The hologram device may be a three dimensional image in the air by using interference of light. The projector may project light onto a screen to display an image. For example, the screen may be located inside or outside the electronic device 100. The display 130 may further include a control circuit for controlling the panel, the hologram device, or the projector.

The display 130 may provide the drawing to the area corresponding to the touch gesture that is received through the input device 120. For example, the display 130 may display the edge of the drawing in the area corresponding to the touch gesture. After determining the display attributes of the drawing, the display 130 may provide the drawing on the basis of the determined display attributes. For example, when the chromaticity of the drawing in the area corresponding to the touch gesture is determined, the display 130 may display the drawing with the determined chromaticity.

The communication module 140 may perform data transmission and/or reception with other electronic devices. According to an embodiment of the present disclosure, the communication module 140 may include a cellular module, a wireless fidelity (Wi-Fi) module, a Bluetooth (BT) module, a GPS module, a near field communication (NFC) module, and a radio frequency (RF) module.

The memory 150 may include an internal memory or an external memory. The internal memory may include at least one of a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like).

The internal memory may be a solid state drive (SSD). The external memory may further include a flash drive, for example, a compact flash (CF), a secure digital (SD), a micro-SD, a mini-SD, an extreme digital (xD), a memory stick, or the like. The external memory may be connected to the electronic device 100 through various interfaces. The electronic device 100 may further include a storage device (or a storage medium) such as a hard disc drive.

The memory 150 may store at least one brush stroke image to create the edge of the drawing.

FIG. 2 illustrates drawing techniques of a watercolor image that are simulated by an electronic device 100 according to various embodiments of the present disclosure.

Referring to FIG. 2, the watercolor techniques may include various drawing techniques. For example, the watercolor drawing techniques may include a wet-on-wet drawing technique and/or a wet-on-dry drawing technique. A diagram 201 illustrates the wet-on-wet drawing technique in which watercolors are painted over other watercolors that have not yet been dried, that is, a brush touch is made on the other wet brush touch before it is dried. Since the next brush touch is made before the previous brush touch has dried in the wet-on-wet drawing technique, the previous brush touch merges with the next brush touch without drawing boundaries to thereby form a drawn image.

A diagram 202 illustrates a wet-on-dry drawing technique in which watercolors are painted over other watercolors that have been dried, that is, a brush touch is made on the other brush touch after it has dried. Since the next brush touch is made after the previous brush touch has been completely dried in the wet-on-dry drawing technique, the previous brush touch is separated from the next brush touch with drawing boundaries to form a drawn image.

The electronic device 100 may perform the wet-on-wet drawing technique using one drawing action that is received through the input device 120. The electronic device 100 may identify the number of touches that are input into each unit portion in the area corresponding to the drawing action while the one received drawing action is maintained. For example, the electronic device 100 may receive a touch gesture including one drawing action. While the one drawing action is maintained, if a plurality of touches occurs in a specific unit portion in the area corresponding to the drawing action, the electronic device 100 may determine that the drawing of the specific unit portion implements the wet-on-wet drawing technique.

The electronic device 100 may perform the wet-on-dry drawing technique using two or more drawing actions that are received through the input device 120. While two or more received drawing actions are maintained, the electronic device 100 may identify the number of touches that are input into each unit portion in the area corresponding to the drawing actions. For example, the electronic device 100 may receive a touch gesture including two or more drawing actions. When the two or more drawing actions are received, if a plurality of touches occurs in a specific unit portion in the area corresponding to the drawing actions, the electronic device 100 may determine the drawing of the specific unit portion implements the wet-on-dry drawing technique.

Figure 3:
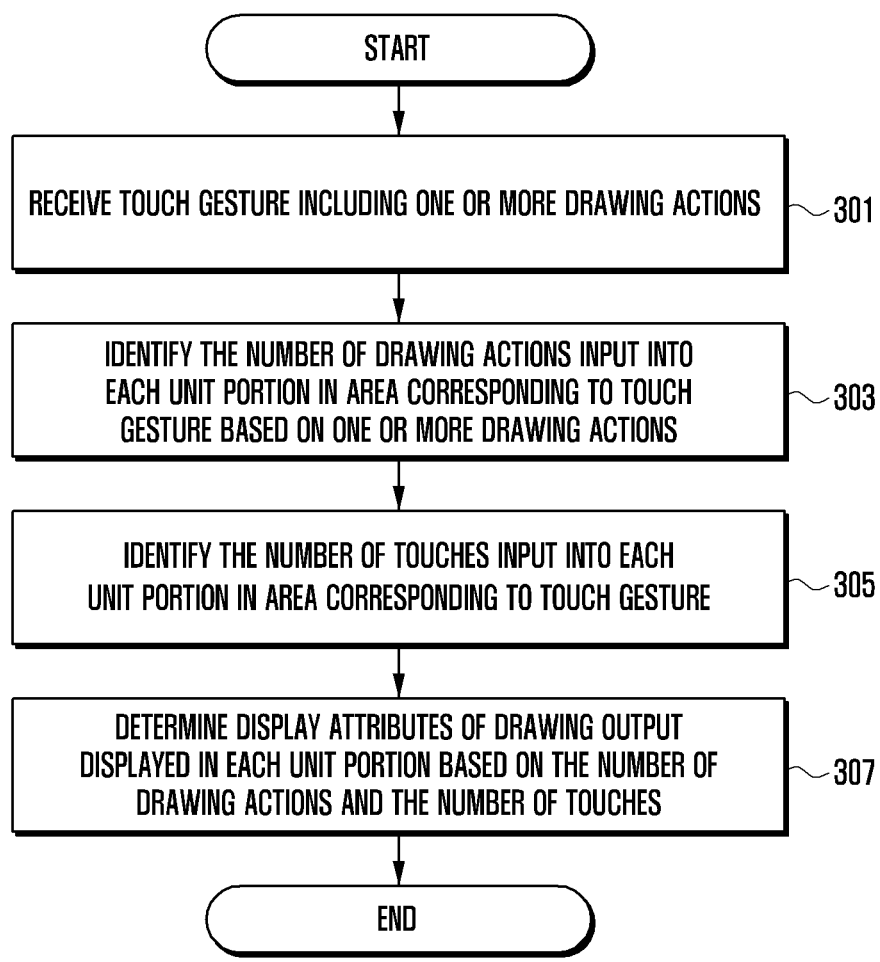
FIG. 3 is a flowchart of determining the display attributes of a drawing, which is displayed in each unit portion where a touch gesture is received, according to various embodiments of the present disclosure.

FIG. 3 is a flowchart of a method to determine the display attributes of the drawing according to various embodiments of the present disclosure.

Referring to FIG. 3, in operation 301, the electronic device 100 may receive a touch gesture including one or more drawing actions. The electronic device 100 may receive the touch gesture using touch input tools, such as, for example, a touch pen, or a user's fingers. One drawing action refers to an operation of creating the brush touch line corresponding to a touch moving gesture, and means a touch gesture of moving a touch from the time when the touch input occurs to the time when the touch input ends. When a touch gesture including one or more drawing actions is received, the electronic device 100 may output the drawing corresponding to the drawing action. For example, when the drawing gesture is received through the input device 120, the electronic device 100 may display a brush touch line corresponding to the drawing gesture through the display 130.

The electronic device 100, in operation 303, may identify the number of drawing actions that are input into each unit portion in the area corresponding to the touch gesture, based on one or more drawing actions received through the input device 120. Each unit portion in the area may be provided in a pixel unit of the display 130.

FIG. 4 illustrates identification of the number of drawing actions and the number of touches according to various embodiments of the present disclosure.

Referring to FIG. 4, the electronic device 100 may receive a touch gesture including the first drawing action, the second drawing action, and the third drawing action through the input device 120 as illustrated in diagram 410. The first, second, and third drawing actions may be scrolling type touch gestures in which a touch input tool, such as a touch pen, touches each of a first area 401, a second area 402, and a third area 403, and then linearly moves in a specific direction. The electronic device 100 may provide the drawing to the first area 401 corresponding to the first drawing action, the second area 402 corresponding to the second drawing action, and the third area 403 corresponding to the third drawing action. The electronic device 100 may identify the number of drawing actions that are input into each unit portion in the area corresponding to the touch gesture. For example, when the electronic device 100 receives the first drawing action and the second drawing action, and the first area 401, corresponding to the first drawing action, and the second area 402, corresponding to the second drawing action, are formed in the display 130. The first unit portion 411 may detect the first drawing action and the second drawing action to identify that two drawing actions have been input in the first unit portion 411. In addition, when the electronic device 100 receives the third drawing action in the third area 403 the third drawing action is formed in the display 130. The second unit portion 412 may detect the third drawing action to identify that a drawing action has been made in the second unit portion 412.

The electronic device 100 may receive a touch gesture including the fourth drawing action through the input device 120 as illustrated in diagram 420. The fourth drawing action may be a touch movement gesture in which a touch input tool, such as a touch pen, reciprocates five times in the fourth area 404 while the touch is maintained. The electronic device 100 may output the drawing to the fourth area 404 based on the fourth drawing action. The electronic device 100 may identify the number of drawing actions that are input into each unit portion in the area corresponding to the touch gesture. For example, when the electronic device 100 receives the fourth drawing action in which the touch reciprocates five times while the touch on the fourth area 404 is maintained, and the fourth area 404 is output in the display 130, the third unit portion 413 may detect the fourth drawing action to thereby identify that one drawing action has been made in the third unit portion 413.

Referring back to operation 305, the electronic device 100 may identify the number of touches that are input into each unit portion in the area corresponding to the touch gesture. Referring to diagram 410 of FIG. 4, the electronic device 100 may receive the first, second, and third drawing actions as a scrolling input in which the touch moves linearly in a specific direction while the touch on each of the first area 401, the second area 402, and the third area 403 is maintained. When the electronic device 100 receives the first and second drawing actions, and the first area 401 and the second area 402 are output in the display 130. The first unit portion 411 may detect the touch according to the first drawing action and the second drawing action to identify two drawing actions have been made in the first unit portion 411. In addition, when the electronic device 100 receives the third drawing action, and the third area 403 is output in the display 130, the second unit portion 412 may detect the touch according to the third drawing action to identify that one drawing action has been made in the second unit portion 412. Referring to diagram 420 of FIG. 4, the electronic device 100 may receive the fourth drawing action in which the touch reciprocates five times in the fourth area 404 while the touch is maintained. When the electronic device 100 receives the fourth drawing action, and the fourth area 404 is output in the display 130, the third unit portion 413 may detect the touch according to the fourth drawing action to identify that a total of ten drawing actions have been made (since two touch inputs occur for one reciprocation, ten touch inputs occur for five reciprocations) in the third unit portion 413.

Referring back to FIG. 3, in operation 307, the electronic device 100 may determine the display attributes of the drawing to be displayed in each unit portion on the basis of the number of drawing actions and the number of touches. The electronic device 100 may determine the display attributes of the drawing in order to provide the effect of the wet-on-wet drawing technique or the wet-on-dry drawing technique based on the number of drawing actions and the number of touches.

According to various embodiments of the present disclosure, when one drawing action is received, the electronic device 100 may determine the display attributes of the drawing such that the chromaticity of the drawing increases depending on the increase in the number of touches. If the number of touches according to one drawing action in the unit portion reaches the predetermined number of touches, the electronic device 100 may determine the display attributes of the drawing such that the chromaticity of the drawing to be displayed in the unit portion decreases depending on the increase in the number of touches.

Figure 5A:
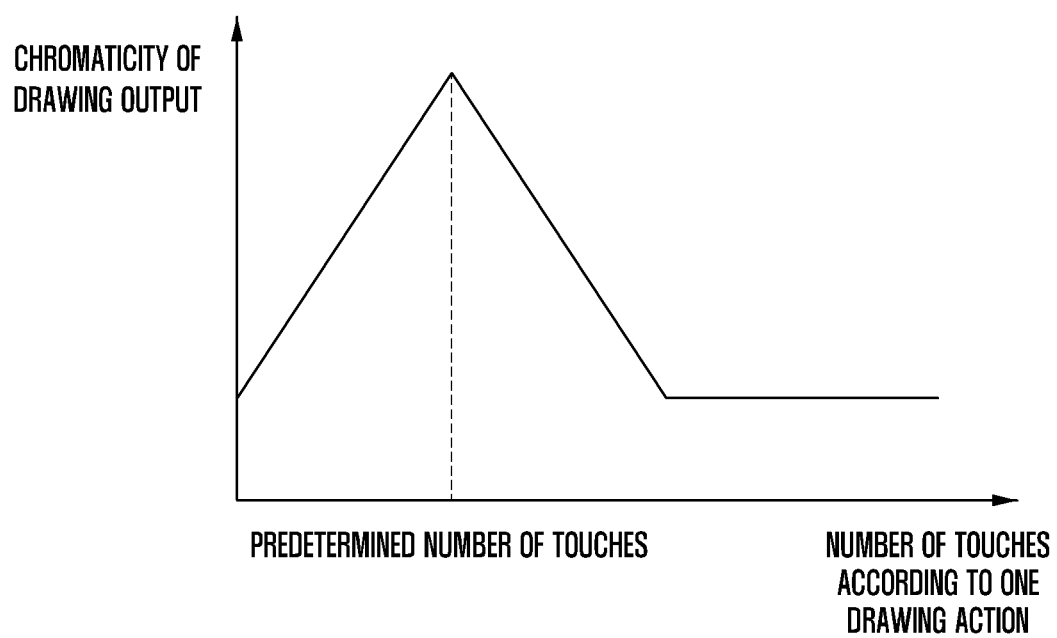
FIG. 5A is a graph of the chromaticity of a drawing according to various embodiments of the present disclosure.

FIG. 5A is a graph of the chromaticity of a drawing according to various embodiments of the present disclosure.

Referring to FIG. 5A, a graph shows that the chromaticity of the drawing varies with the number of touches according to one drawing action. When the electronic device 100 receives one drawing action, as the number of touches according to the one drawing action increases up to the predetermined number of touches, the chromaticity of the drawing may increase. If the number of touches according to the one drawing action reaches the predetermined number of touches, as the number of touches in the unit portion increases, the chromaticity of the drawing may decrease.

Figure 5B:
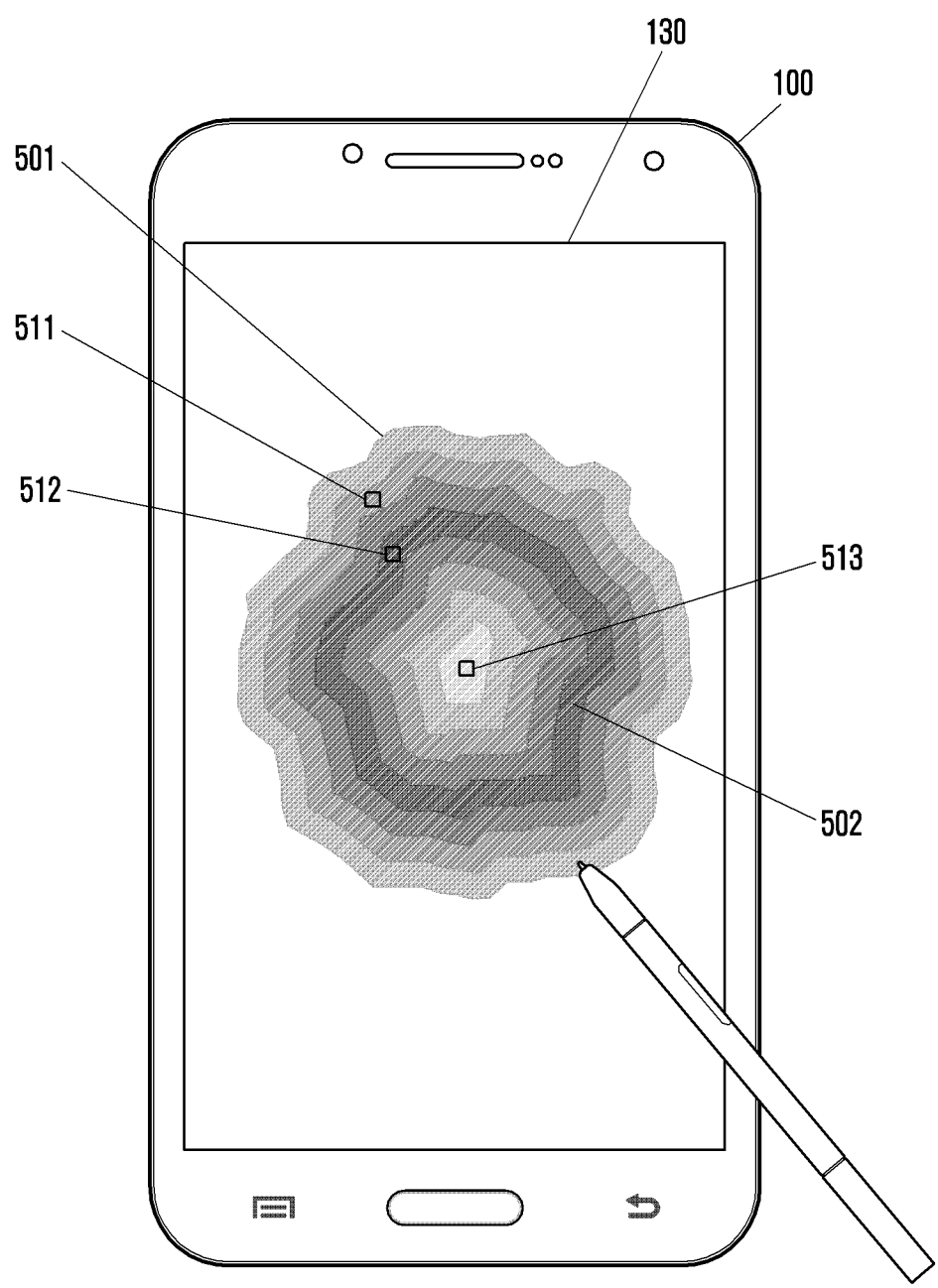
FIG. 5B illustrates an operation of determining the chromaticity of a drawing according to various embodiments of the present disclosure.

FIG. 5B illustrates an operation of determining the chromaticity of a drawing according to various embodiments of the present disclosure.

Referring to FIG. 5B, a graph shows an example in which the chromaticity of the drawing varies on the basis of the number of touches according to the one drawing action. The electronic device 100 may receive the one drawing action, which is a touch moving gesture conducted in the area including the first area 501 and the second area 502. It is assumed that five touch inputs occur in the first unit portion 511 in the first area 501, nine touch inputs occur in the second unit portion 512 in the first area 501, and fifteen touch inputs occur in the third unit portion 513 in the second area 502 while the one drawing action is conducted. If the predetermined number of touches is ten, and if the chromaticity of the drawing in the corresponding unit portion is determined to be 10 when a predetermined number of touches occur, the electronic device 100 may determine the chromaticity of the drawing of the first unit portion 511 in the first area 501 to be 5. Likewise, the electronic device 100 may determine the chromaticity of the drawing of the second unit portion 512 in the first area 501 to be 9, and may determine the chromaticity of the drawing of the third unit portion 513 in the second area 502 to be 5. That is, as the number of touches increases, the chromaticity of the drawing in the corresponding unit portion may increase, and as the number of touches exceeds the predetermined number of touches, the chromaticity of the drawing in the corresponding unit portion may decrease. This is intended to provide the effect of the wet-on-wet drawing technique, the chromaticity in the area decreases because the amount of water increases in the area where the watercolors are painted over more than the predetermined number of times.

In order to provide the effect of the wet-on-wet drawing technique, the determining of the display attributes of the drawing may be carried out using the following equation. For example, if the number of touches according to one drawing action is less than the predetermined number of touches, the chromaticity value according to the number of touches may be obtained using maxIntesity=$I_{start}$+LayerPlane(x,y)·delta. Here, maxIntensity is a chromaticity value determined based on the number of touches according to one drawing action, and $I_{start}$ denotes an initial chromaticity value. In addition, LayerPlane(x, y) may indicate the number of touches in a specific unit portion. In another example, if the number of touches of one drawing action is greater than the predetermined number of touches, the chromaticity value according to the number of touches may be obtained using maxIntesity=$I_{max}$−min{LayerPlane(x, y)−threshold, threshold}·delta. Here, delta, $I_{max}$, and threshold may denote the amount of change in the chromaticity, the maximum chromaticity value corresponding to the predetermined number of touches, and the predetermined number of touches, respectively. In addition, $I_{max}$ may be calculated using $I_{max}$=$I_{start}$+threshold·delta.

When the electronic device 100 receives two or more drawing actions, the electronic device 100 may determine the display attributes of the drawing such that the chromaticity of the drawing increases depending on the increase in the number of touches according to the two or more drawing actions in the unit portion. If the number of touches according to the two or more drawing actions in the unit portion reaches the predetermined number of touches, the electronic device 100 may determine the display attributes of the drawing such that the chromaticity of the drawing remains constant depending on the increase in the number of touches.

Figure 6A:
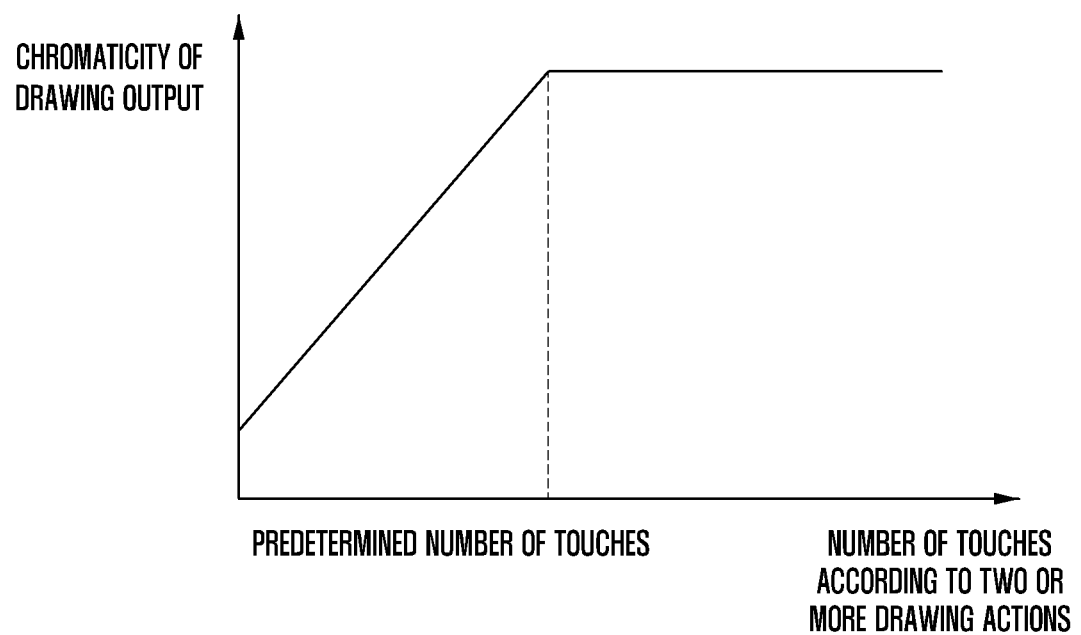
FIG. 6A is a graph of the chromaticity of a drawing according to various embodiments of the present disclosure.

FIG. 6A is a graph of the chromaticity of a drawing according to various embodiments of the present disclosure.

Referring to FIG. 6A, a graph shows that the chromaticity of the drawing varies with the number of touches according to two or more drawing actions. That is, when the electronic device 100 receives two or more drawing actions, as the number of touches according to the two or more drawing actions in each unit portion in the area increases up to the predetermined number of touches, the chromaticity of the drawing in the unit portion may increase. If the number of touches according to the two or more drawing actions reaches the predetermined number of touches, as the number of touches in the unit portion increases, the electronic device 100 may maintain the chromaticity of the drawing to be constant.

Figure 6B:
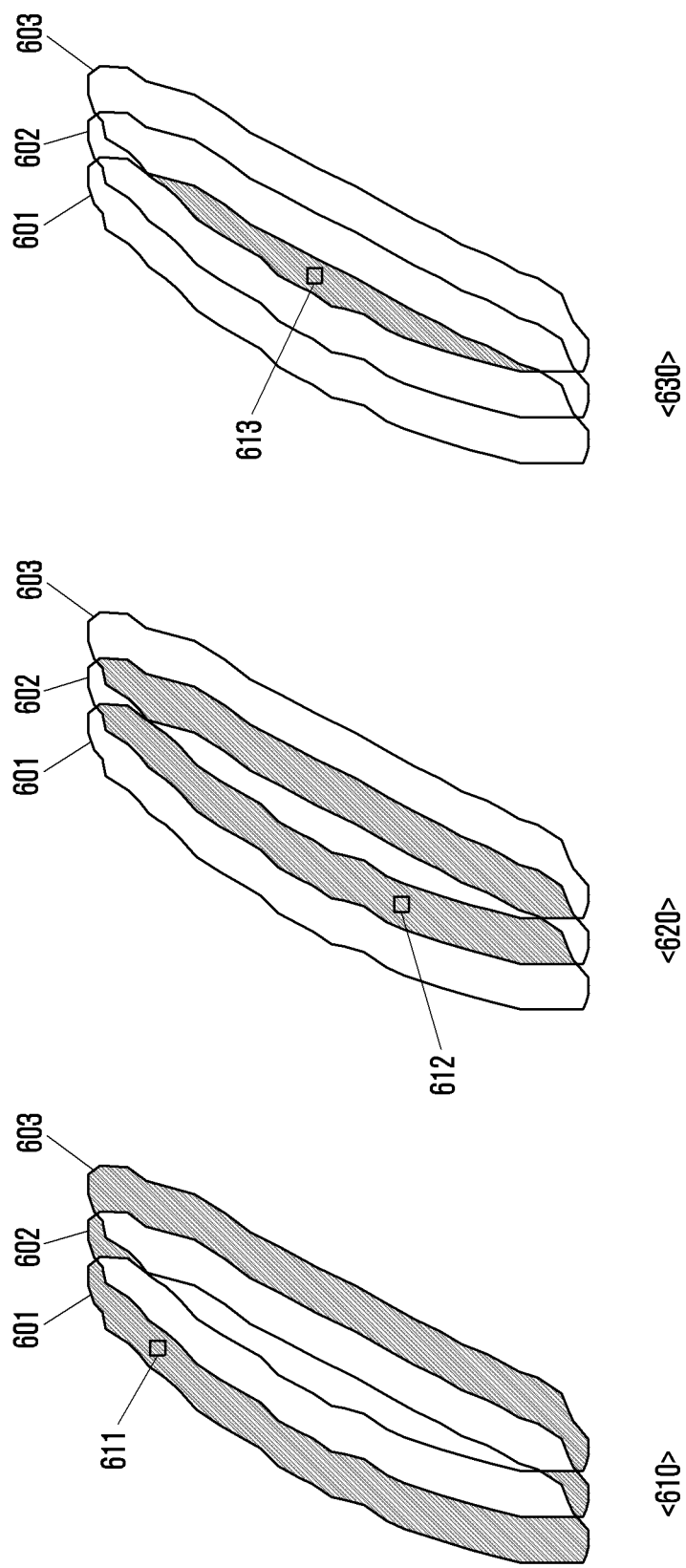
FIG. 6B illustrates an operation of determining the chromaticity of a drawing on the basis of a number of touches according to at least one two drawing actions, according to various embodiments of the present disclosure.

FIG. 6B illustrates an operation of determining the chromaticity of a drawing according to various embodiments of the present disclosure.

Referring to FIG. 6B, three examples illustrate that the chromaticity of the drawing varies with the number of touches according to two or more drawing actions. That is, the electronic device 100 may receive three drawing actions that are touch scrolling gestures the first area 601, the second area 602, and the third area 603, respectively. In each unit portion in the first area 601, the second area 602, and the third area 603, the portion where one drawing action is made may detect one touch input, the portion where two drawing actions are made may detect two touch inputs, and the portion where three drawing actions are made may detect three touch inputs. For example, in diagram 610, the electronic device 100 may identify that one touch input occurs according to one drawing action in the first area 601, the second area 602, and the third area 603. That is, since a single touch input occurs in the first unit portion 611 of the first area 601, the electronic device 100 may determine the chromaticity of the drawing in the first unit portion 611 to be 1. Referring to diagram 620, the electronic device 100 may identify that two touch inputs occur according to two drawing actions in each unit portion that is shaded in the first area 601, the second area 602, and the third area 603. That is, since two touch inputs occur in the second unit portion 612 of the first area 601 and the second area 602, the electronic device 100 may determine the chromaticity of the drawing displayed in the second unit portion 612 to be 2. Referring to diagram 630, the electronic device 100 may identify that three touch inputs occur according to three drawing actions in each unit portion that is shaded in the first area 601, the second area 602, and the third area 603. That is, since three touch inputs occur in the third unit portion 613 of the first area 601, the second area 602, and the third area 603, the electronic device 100 may determine the chromaticity of the drawing displayed in the third unit portion 613 to be 3.

If the number of touches in each unit portion reaches the predetermined number of touches, the electronic device 100 may maintain the chromaticity of the drawing in the unit portion to be constant depending on the increase in the number of touches. For example, if the predetermined number of touches is five, and if the chromaticity of the drawing in the corresponding unit portion is determined to be 5 when a predetermined number of touches occur, the electronic device 100 may determine the chromaticity of the drawing of a specific unit portion in a specific area to be 5. Afterwards, even though more than five touch inputs occur according to more than five drawing actions in the specific unit portion of the specific area, the electronic device 100 may determine the chromaticity of the drawing of the specific unit portion to be 5. This is intended to provide the effect of the wet-on-dry drawing technique in which the chromaticity in the area that the watercolors are painted over does not further increase.

Figure 7:
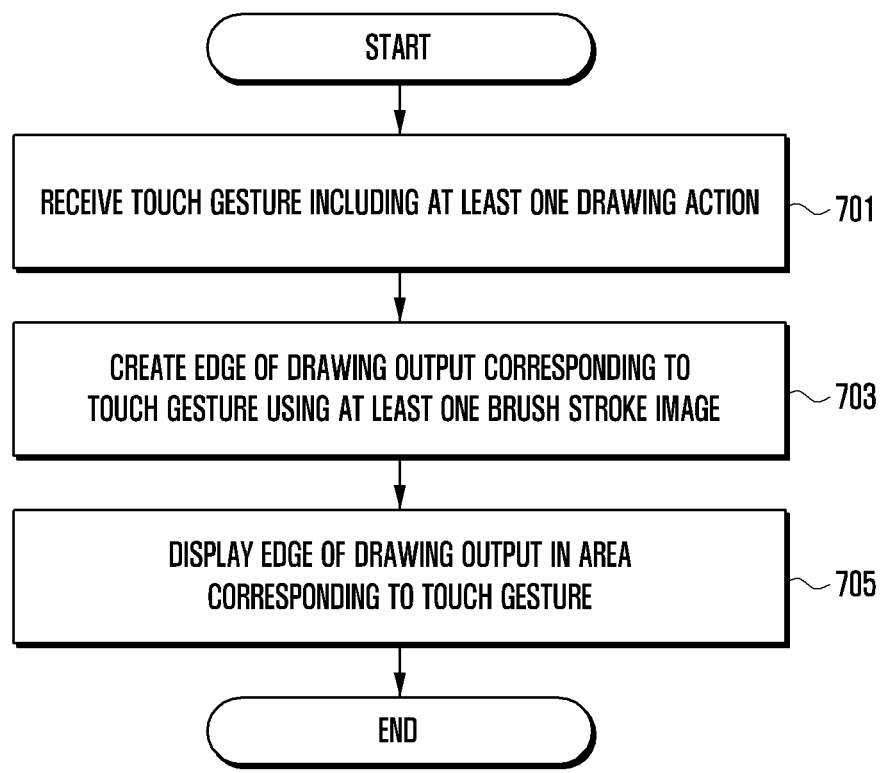
FIG. 7 is a flowchart of a method of creating an edge of a drawing using at least one brush stroke image, according to various embodiments of the present disclosure.

FIG. 7 is a flowchart of a method of creating an edge of a drawing using one or more brush stroke images according to various embodiments of the present disclosure.

Referring to FIG. 7, in operation 701, the electronic device 100 may receive a touch gesture including one or more drawing actions. The electronic device 100 may receive a touch gesture including one or more drawing actions using touch input tools, such as, for example, a touch pen, or user's fingers. One drawing action refers to an operation of creating the edge of the drawing corresponding to the touch gesture, and means a touch gesture of moving a touch from the time when the touch input occurs to the time when the touch input ends. The edge of the drawing may be the shape of a brush touch line corresponding to the touch gesture. When a touch gesture is received, the electronic device 100 may output the drawing corresponding to the drawing action. For example, when a drawing gesture is received through the input device 120, the electronic device 100 may display the edge of the drawing corresponding to the drawing gesture through the displays 130.

In operation 703, the electronic device 100 may create the edge of the drawing corresponding to the touch gesture by using one or more brush stroke images. The electronic device 100 may continuously dispose the brush stroke images to thereby create the edge of the drawing without using a physical model, so the time for calculating a physical model is not necessary. The brush stroke image may be a dot-shaped image that is output when the brush touches the paper first to draw the brush touch line.

FIG. 8 illustrates creating an edge of a drawing using at least one brush stroke image according to various embodiments of the present disclosure.

Referring to FIG. 8, diagram 810 illustrates images 801a, 801b, 802c, 802d, 802e, 802f, 802g, and 801h and may represent the brush stroke images. The electronic device 100 may arrange one or more brush stroke images at a predetermined interval along the path of the touch gesture in order to thereby create the edge of the drawing. In this case, the electronic device 100 may randomly select one or more brush stroke images and may arrange the same at a predetermined interval. For example, referring to diagram 820, the electronic device 100 may receive a drawing action to perform a touch moving gesture in the first area 801. The electronic device 100 may display the edge 811 of the first drawing in the area 801 corresponding to the received drawing action. After that, when the touch input tool moves a predetermined distance d, the electronic device 100 may combine at least one pre-stored brush stroke image, for example, image 801b, with the edge 811 of the first drawing to create the edge 812 of the second drawing. In this case, the electronic device 100 may randomly select brush stroke image 801b from the first to eighth brush stroke images 801a, 801b, 802c, 802d, 802e, 802f, 802g, and 801h, and may combine the same so that the brush line looks like an actual line. The method of providing the drawing, according to various embodiments of the present disclosure, may be carried out using the following equation. For example, the edge of the drawing may be created and a chromaticity value of the created drawing may be obtained using $I(x, y)-\min\{\max[I(x, y), M(x', y')], \text{maxIntensity} \cdot s\}$. In this example, $I(x, y)$ denotes a chromaticity value displayed in the corresponding unit portion, M(x', y') denotes a chromaticity value displayed in the unit portion of the brush stroke image, maxIntensity may refer to a chromaticity value that is determined on the basis of the number of touches in the corresponding unit portion, and s means a corrected chromaticity value in the corresponding unit portion which may be obtained using $$s = s_{min} + \frac{(1 - s_{min})}{N} pointsCount.$$

N may denote the total number of brush stroke images that are corrected, and pointsCount may mean the number of brush stroke images at the edge of the corresponding drawing.

Referring back to FIG. 7, in operation 705, the electronic device 100 may output the drawing to the area corresponding to the touch gesture. More specifically, the electronic device 100 may display the edge of the drawing that is created using at least one brush stroke image in the area corresponding to the touch gesture. For example, referring to FIG. 8, if the touch input tool moves a predetermined distance d while the edge 811 of the first drawing is displayed, the electronic device 100 may display, in the display 130, the edge 812 of the second drawing, which is created by combining the second brush stroke image 801b with the edge 811 of the first drawing.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    an input device configured to receive a touch gesture that includes a drawing action;
    a display configured to output a drawing to an area corresponding to the touch gesture; and
    a processor configured to:
        identify a number of drawing actions that are input into each unit portion in the area and a number of touches input into each unit portion in the area based on the drawing action,
        if the drawing action is received, determine display attributes of the drawing such that the chromaticity of the drawing in each unit portion increases based on the number of touches, and
        if the number of touches reaches a predetermined number of touches, determine the display attributes of the drawing such that the chromaticity of the drawing decreases based on the increase in the number of touches,
    wherein the drawing action includes a touch from a time when a touch input occurs to a time when the touch input ends.

2. The electronic device of claim 1, wherein the processor is further configured to, when two drawing actions are received, determine the display attributes of the drawing such that the chromaticity of the drawing increases based on the increase in the number of touches.

3. The electronic device of claim 2, wherein the processor is further configured to, if the number of touches reaches a predetermined number of touches, determine the display attributes of the drawing such that the chromaticity of the drawing remains constant.

4. The electronic device of claim 1, wherein the processor is further configured to:
    create an edge of the drawing corresponding to a second touch gesture based on a brush stroke image, and
    display the created edge of the drawing.

5. The electronic device of claim 4, wherein the processor is further configured to dispose a brush stroke image at a predetermined interval along a path of the second touch gesture.

6. The electronic device of claim 4, further comprising a memory configured to store the brush stroke image.

7. The electronic device of claim 4, wherein the processor is further configured to:
    randomly select the brush stroke image from a group of brush stroke images, and
    create the edge of the drawing based on the selected brush stroke image.

8. A method for simulating a digital watercolor image in an electronic device, the method comprising:
    receiving a touch gesture that includes a drawing action through an input device; and
    outputting a drawing in the area corresponding to the touch gesture,
    wherein the outputting of the drawing comprises:
        identifying a number of drawing actions that are input into each unit portion in the area based on the drawing action,
        identifying a number of touches that are input into each unit portion,
        determining display attributes of the drawing such that the chromaticity of the drawing in each unit portion increases based on the number of touches, and
        if the number of touches reaches a predetermined number of touches, determining the display attributes of the drawing such that the chromaticity of the drawing decreases based on the increase in the number of touches, and
    wherein the drawing action includes moving a touch from a time when a touch input occurs to a time when the touch input ends.

9. The method of claim 8, wherein the determining of the display attributes comprises, when two drawing actions are received, determining the display attributes of the drawing such that the chromaticity of the drawing increases based on the increase in the number of touches.

10. The method of claim 9, wherein the determining of the display attributes comprises, if the number of touches reaches a predetermined number of touches, determining the display attributes of the drawing such that the chromaticity of the drawing remains constant.

11. The method of claim 8, wherein the providing of the drawing comprises:
    creating an edge of the drawing corresponding to a second touch gesture based on a brush stroke image; and
    displaying the created edge of the drawing.

12. The method of claim 11, wherein the creating of the edge comprises disposing a brush stroke images at a predetermined interval along a path of the second touch gesture.

13. The method of claim 11, wherein the creating of the edge comprises storing the brush stroke image.

14. The method of claim 11, wherein the creating of the edge comprises;
    randomly selecting the brush stroke image from a group of brush stroke images; and creating the edge of the drawing based on the selected brush stroke image.

15. A non-transitory computer readable medium including instructions thereon that, when executed by a processor, cause the processor to:
- receive a touch gesture that includes a drawing action through an input device;
- identify a number of drawing actions that are input into each unit portion in the area based on the drawing action;
- identify a number of touches that are input into each unit portion;
- determine display attributes of the drawing such that the chromaticity of the drawing in each unit portion increases based on the number of touches; and
- if the number of touches reaches a predetermined number of touches, determining the display attributes of the drawing such that the chromaticity of the drawing decreases based on the increase in the number of touches; and
- output the drawing based on the display attributes,
- wherein the drawing action includes moving a touch from a time when a touch input occurs to a time when the touch input ends.

* * * * *